United States Patent Office 3,024,161
Patented Mar. 6, 1962

3,024,161
STABLE, DRY BORDEAUX MIXTURE
Robert W. McAllister, Box 85, Carlisle, Mass.
No Drawing. Filed Oct. 5, 1959, Ser. No. 844,214
3 Claims. (Cl. 167—16)

This invention relates to a fungicide and a process for preparing it and more particularly to a fungicide suitable for application in dust form.

It has been known for many years that so-called "Bordeaux mixture" which is a composition formed by mixing water solutions of lime hydrate ($Ca(OH)_2$) and copper sulfate ($CuSO_4$) forms an effective fungicide and may be used to control fungus diseases on a wide variety of plants. The bluish precipitate which is formed in the preparation of the Bordeaux mixture is effective when freshly applied to foliage. For many diseases no equally effective fungicide has ever been developed.

It has been the practice in the prior art to apply the Bordeaux mixture in water solution made by mixing, for example, 5 pounds of lime hydrate in 25 gallons of water and 5 pounds of copper sulfate in another 25 gallons of water. These two solutions were then mixed and applied to foliage by known spraying techniques.

In the past years the economy has so changed that it is less feasible to apply fungicides in a water spray form, inasmuch as spraying costs are extremely high. Thus the development in funicides has been directed toward the use of powdered materials which can be dusted on by means of an airplane or helicopter. In actual practice now spraying costs may range from 6 to 10 times dusting costs. This means that although the original cost of the dusts now used is considerably higher than the components of a Bordeaux mixture, the latter has been replaced by dust-type fungicides because of the high application costs associated with a spray.

However, it would still be desirable to be able to use Bordeaux mixture because the reaction product between lime hydrate and the copper sulfate constitutes an extremely effective fungicide. Moreover the components making up a Bordeaux mixture are inexpensive, plentiful and easily handled, and there has been built up over many years of use an extensive fund of experience in handling this mixture as a fungicide.

Merely to apply a physical mixture of lime hydrate and copper sulfate is not the solution to the problem of using these components in dry form. This is due to the fact that such a physical mixture of these components in their normally occurring forms suffers from the solubility problems inherent in each of the components. Lime hydrate itself, although it occurs in very fine form, is extremely insoluble in water, of the order of about 0.01% by weight. Copper sulfate on the other hand although soluble in water is extremely slow to dissolve. Thus if a mere physical mixture of lime hydrate and copper sulfate were spread, even on heavily wetted leaves, the fungicidal effect would be little if any. This is due to the undesirable solubility characteristics of the components which in turn mean that little if no reaction between the components can take place if they are applied in such a physical mixture. Moreover to mix lime hydrate and the commonly occurring pentahydrated form of copper sulfate is not acceptable for the water of hydration in the copper sulfate rapidly causes a reaction within the dry mixture which results in a fungicide of low effectiveness when applied as a dust.

I have found that it is possible to make a dry premixed Bordeaux which overcomes the difficulties inherent in the spray solution and also inherent in a mere physical mixture of the components. Thus the premixed Bordeaux of this invention may be stored over extended periods of time without losing any appreciable fungicidal effectiveness and may be applied as a dust to leaves and foliage to achieve essentially instantaneous reaction when brought into contact with water on the foliage.

The fungicide composition of this invention may generally be defined as a mixture consisting essentially of commercial lime hydrate and copper sulfate having no more than one mol of water of hydration and sized finer than 45 microns, the composition being further characterized as being in the form when applied to the foliage of powdery aggregates sized between about 25 and 75 microns in diameter and containing the lime and copper sulfate particles in intimate contact and in a predetermined weight ratio within each aggregate striking the foliage.

The process of this invention for preparing a fungicide suitable for application in the form of a dust may be characterized by the step of tumbling together commercial lime hydrate and copper sulfate having no more than one mol of water of hydration and sized finer than 45 microns to form an intimate mixture so that when the mixture is applied by known dusting techniques the fungicide is deposited on the foliage in the form of powdery aggregates ranging in size from 25 to 75 microns, wherein the lime hydrate and the copper sulfate are in intimate contact and available for essentially instantaneous reaction in the presence of water.

The powdery aggregates of this invention as applied to foliage contain the lime hydrate and the copper sulfate in the form and size range specified may be further characterized as having the calcium hydrate in a sponge-like form thereby to support and contain the copper sulfate. Thus each aggregate forming the fungicide dust of this invention contains the two components in extremely finely divided state of subdivision and in intimate contact. This means that when a dust aggregate contacts dew or water in any other form on a leaf, the finely divided lime hydrate and copper sulfate are available for essentially instantaneous reaction to form the necessary precipitate which serves as the fungicide.

The effective fungicide composition derived from Bordeaux mixture is not thoroughly understood but it is believed to be a solution of copper basic sulfate in calcium sulfate.

In preparing the composition of this invention it is not necessary to further reduce the size of naturally occurring lime hydrate particles since they occur in a size range from about 1 to 3 microns. However, copper sulfate must be further processed to remove water of hydration, at least to the extent that the copper is in the form of the monohydrate and is preferably in the anhydrous form. Moreover, they very hard crystals of copper sulfate must be ground or otherwise reduced in particle size so that the ultimate size of these crystals is no larger than about 45 microns. The copper sulfate is preferably reduced to the extent that no appreciable quantity of particles are larger than 10 microns.

In order to form the dust aggregates which are the fungicide of this invention it is necessary to bring the very finely divided lime hydrate and copper sulfate into intimate contact, and this is conveniently accomplished by tumbling the lime hydrate and the copper sulfate in any suitable apparatus such as a ribbon mixer or blender. When the intimate mixture of finely divided lime hydrate and copper sulfate are applied to foliage by any conventional dry duster or forced through screens (e.g., 200-mesh) into an air stream the lime hydrate is of such a character that the very fine particulate matter tends to form spongy agglomerates during such application and the final result is the formation of powdery aggregates in which the hard copper sulfate crystals are contained within and supported by the sponge-like lime hydrate. Thus the final powdery aggregates making up the dust fungicide at the point of application may be described as having the copper sulfate crystals located within and supported by a lime hydrate structure.

The relative amounts of lime hydrate and copper sulfate may be varied over a range. In order to get the most commonly-used mixture on the leaf for reactoin it is preferable that the lime hydrate and the copper sulfate be present in essentially equal parts by weight. However suitable dusts have been prepared from ratios of three parts by weight of lime hydrate to one of copper sulfate up to three parts of copper sulfate to one of lime hydrate.

The use of the premixed Bordeaux prepared in accordance with the practice of this invention possesses several advantages over the spray-applied Bordeaux solution. These advantages include the attainment of greater uniformity of leaf protection, the ability to achieve the same amount of protection with lower amounts of lime hydrate and copper sulfate per unit area, achievement of greater initial effectiveness, increased adhering power and less drain-off.

It may in some instances be desirable to add a wetting or sticking agent such as Triton 114 (a nonionic surfactant containing isooctyl phenyl polyethoxy ethanol sold by Rohm and Haas Co.) to the dust composition of this invention. The need for such an additive will depend upon the type of foliage to which the Bordeaux mixture is applied. Such an additive will generally be present in no more than 0.1% by weight of the fungicide.

X-ray spectrograph studies show that dry lime hydrate mixed with finely divided copper sulfate pentahydrate rapidly react to form copper oxides and calcium sulfate. Mixed samples of dry lime hydrate and copper sulfate monohydrate react only slightly during long time storage periods and such reaction can be prevented by use of 1 to 5% quicklime in the mixture. Mixtures of dry lime hydrate and anhydrous copper sulfate may be stored indefinitely without reaction taking place. The product made by mixing finely divided copper sulfate pentahydrate with dry lime hydrate has greatly reduced fungicidal effectiveness after one or more days storage.

*Example I*

Anhydrous copper sulfate was reduced to a finely divided state in an air attrition mill sold under the trade mark "Micronizer." In this type of mill particles are suspended in air or steam and are whirled at high velocity to obtain a grinding action. The final particle size of the copper sulfate ranged from about 5 to 45 microns with the major portion being sized less than 10 microns.

Five pounds of this copper sulfate was then milled with 5 pounds of lime hydrate in a ribbon mill to form an intimate mixture of the two components. The mixture was applied to grape foliage by forcing it through a 200-mesh screen and the powdery aggregates applied averaged about 50 microns. No appreciable portion of the aggregates were larger than 75 microns. The aggregates contained about equal portions of the lime hydrate and copper sulfate. The fungicide dust was applied to the grape foliage in the morning while dew was still on the leaves. The lime hydrate and copper sulfate reacted almost instantaneously when they contacted the dew to form the bluish precipitate associated with Bordeaux mixture. This fungicide proved exceptionally effective in killing fungi and in preventing additional fungi from developing on the leaves.

*Example II*

The monohydrate form of copper sulfate was used in place of the anhydrous material of Example I to make a fungicide. During the tumbling of equal weights of copper sulfate monohydrate and lime hydrate 0.3 pound of calcium oxide (quicklime) sized finer than 75 microns was added. The effectiveness of the resulting dust was equal to that of the fungicide dust of Example I. Samples of such product examined after one month storage in asphalt-laminated bags showed that none of the copper sulfate had been degraded to calcium sulfate.

*Example III*

Copper sulfate pentahydrate was placed overnight in an oven maintained at 150° C. to remove four mols of water of hydration. Subsequently it was cooled and reduced to below 10 microns in size in an air attrition mill.

This copper sulfate was tumbled with lime hydrate to form mixtures containing copper sulfate and lime hydrate in weight ratios of 3 to 1 and 1 to 3.

The two mixtures were applied as in Example I to grape foliage, apple leaves and tomatoes. They both proved to be effective fungicides.

It will be seen from the above description that this invention provides a novel fungicide dust which possesses the advantages inherent in Bordeaux mixtures, such advantages including the use of inexpensive components, and well established effectiveness of the material as a fungicide. Moreover the composition of this invention is in the form of a dust and may be applied by known dusting techniques, thus making Bordeaux mixture again available as a low-cost fungicide.

I claim:

1. As a new composition of matter an aggregate ranging in size from 25 to 75 microns and comprising lime hydrate and copper sulfate, said lime hydrate being in a sponge-like form thereby to support and contain said copper sulfate, and said copper sulfate being sized less than 45 microns in diameter and being present in a form selected from the group consisting of anhydrous copper sulfate and copper sulfate monohydrate, the weight ratios of said lime hydrate to said copper sulfate ranging from 1:3 to 3:1.

2. As a new composition of matter an aggregate ranging in size from 25 to 75 microns and consisting essentially of lime hydrate, copper sulfate and calcium oxide, said lime hydrate being in a sponge-like form thereby to support and contain said copper sulfate, and said copper sulfate being sized less than 45 microns in diameter and being present in a form selected from the group consisting of anhydrous copper sulfate and copper sulfate monohydrate, said calcium oxide being present in a concentration equivalent to from about 1 to 5% by weight of said composition and the weight ratios of said lime hydrate to said copper sulfate ranging from 1:3 to 3:1.

3. As a new composition of matter an aggregate ranging in size from 25 to 75 microns and consisting essentially of lime hydrate, copper sulfate and a surfactant, said lime hydrate being in a sponge-like form thereby to support and contain said copper sulfate, and said copper sulfate being sized less than 45 microns in diameter and being present in a form selected from the group consisting of anhydrous copper sulfate and copper sulfate monohydrate, said surfactant being present in a concentration up to about 0.1% by weight of said composition and the weight ratios of said lime hydrate to said copper sulfate ranging from 1:3 to 3:1.

References Cited in the file of this patent

UNITED STATES PATENTS 1,105,642  Forester _____ Aug. 4, 1914

OTHER REFERENCES

Hanna: Handbook of Agricultural Chemical (2d ed.), 1958, pp. 162–163.

Frear: Chemistry of the Pesticides (third ed.), 1955, pp. 316–323.